United States Patent
Bartos et al.

(10) Patent No.: US 10,049,443 B2
(45) Date of Patent: Aug. 14, 2018

(54) METHOD AND SYSTEM FOR DETERMINING THE PRESENCE OR ABSENCE OF A PART OF AN ASSEMBLY WITHIN A WORK CELL

(71) Applicant: Liberty Reach Inc., Clearwater, ID (US)

(72) Inventors: Gary W. Bartos, Somerville, MA (US); David Shultis, Ann Arbor, MI (US)

(73) Assignee: Liberty Reach Inc., Clearwater, ID (US)

( * ) Notice: Subject to any disclaimer, the term of this patent is extended or adjusted under 35 U.S.C. 154(b) by 54 days.

(21) Appl. No.: 15/249,613

(22) Filed: Aug. 29, 2016

(65) Prior Publication Data

US 2018/0061043 A1 Mar. 1, 2018

(51) Int. Cl.

| | |
|---|---|
| *G06K 9/00* | (2006.01) |
| *G06T 7/00* | (2017.01) |
| *H04N 13/204* | (2018.01) |
| *G06K 9/20* | (2006.01) |
| *G06T 15/20* | (2011.01) |
| *H04N 5/33* | (2006.01) |
| *G01B 11/00* | (2006.01) |
| *G01B 11/25* | (2006.01) |
| *G06F 3/0481* | (2013.01) |
| *G06F 3/0484* | (2013.01) |

(52) U.S. Cl.
CPC .......... *G06T 7/0008* (2013.01); *G01B 11/002* (2013.01); *G01B 11/25* (2013.01); *G06K 9/2081* (2013.01); *G06T 15/205* (2013.01); *H04N 5/332* (2013.01); *H04N 13/204* (2018.05); *G06F 3/04815* (2013.01); *G06F 3/04845* (2013.01); *G06T 2200/24* (2013.01); *G06T 2207/10028* (2013.01); *G06T 2207/10048* (2013.01); *G06T 2207/30164* (2013.01); *G06T 2207/30248* (2013.01)

(58) Field of Classification Search
USPC ........................................................ 382/152
See application file for complete search history.

(56) References Cited

U.S. PATENT DOCUMENTS

| | | | |
|---|---|---|---|
| 6,542,249 B1 | 4/2003 | Kofman et al. | |
| 8,364,344 B2 | 1/2013 | Boss et al. | |
| 8,493,496 B2 | 7/2013 | Freedman et al. | |
| 8,803,708 B2 | 8/2014 | Areny et al. | |
| 9,248,353 B1 * | 2/2016 | Koenig | A63B 57/00 |

(Continued)

OTHER PUBLICATIONS

EP Application No. 17186892 EP Search Report dated Dec. 18, 2017.

*Primary Examiner* — Jerome Grant, II
(74) *Attorney, Agent, or Firm* — Brooks Kushman P.C.

(57) ABSTRACT

A method and system for determining the presence or absence of a part of an assembly within at least one user-defined, 3-D detection region within a work cell are provided. The system includes a 3-D or depth sensor having a field of view at the work cell. The sensor has a set of radiation sensing elements which detect reflected, projected radiation to obtain 3-D sensor data. A processor processes the sensor data from the sensor to obtain a 3-D graphic of the at least one detection region. A display displays the 3-D graphic from a viewpoint to determine the presence or absence of the part within the detection region.

26 Claims, 3 Drawing Sheets

(56) References Cited

U.S. PATENT DOCUMENTS

| | | | |
|---|---|---|---|
| 2004/0246471 A1* | 12/2004 | Matsuura | G01S 7/4972 |
| | | | 356/141.4 |
| 2004/0253010 A1* | 12/2004 | Takahashi | G03G 15/6529 |
| | | | 399/16 |
| 2006/0071154 A1* | 4/2006 | Osako | G01V 8/20 |
| | | | 250/221 |
| 2007/0229661 A1* | 10/2007 | Aoki | B60R 21/01538 |
| | | | 348/148 |
| 2010/0118123 A1 | 5/2010 | Freedman et al. | |
| 2011/0134114 A1 | 6/2011 | Rais et al. | |
| 2011/0205341 A1 | 8/2011 | Wilson et al. | |
| 2014/0036070 A1* | 2/2014 | Eckard | G06K 9/00624 |
| | | | 348/135 |
| 2015/0124086 A1 | 5/2015 | Melle et al. | |
| 2015/0266153 A1* | 9/2015 | Kanehira | B23Q 11/08 |
| | | | 483/10 |
| 2017/0287212 A1* | 10/2017 | Tran | G06T 17/10 |

* cited by examiner

METHOD AND SYSTEM FOR DETERMINING THE PRESENCE OR ABSENCE OF A PART OF AN ASSEMBLY WITHIN A WORK CELL

TECHNICAL FIELD

At least one aspect of the present invention generally relates to methods and systems for determining the presence or absence of a part of an assembly and, in particular, to an optical method and systems for determining the presence or absence of a part of an assembly at a work cell or station.

OVERVIEW

Manufacturers typically want a presence/absence system to determine, for example, whether a door, hood, deck lid (trunk), or other hinged part is open or closed when a vehicle body is stationed in a robot work cell. Industrial robot arms are trained to follow paths through work envelopes in space, but robot arms are "blind" on their own and must rely on other sensors to determine whether the vehicle and its parts are properly positioned. For some applications, the customer wants to confirm that a hinged part is in one of several indexed positions, where the distance between indexed positions for the free end of the hinged part may only be a few centimeters. For some applications, the customer wants to confirm that an arbitrarily-fixtured part is present at all, or whether a particular region of space is clear of any obstruction.

Sometimes a hinged vehicle part isn't clamped properly, and the hinged part that should be closed may swing open. Alternately, a part that should be open to allow a robot to move inside the vehicle body may swing shut, obstructing the robot's trained path. If a hinged part isn't clamped properly, a collision between robot and vehicle body may occur. Collisions are expensive in terms of robot repairs and production downtime.

Referring to the drawings and, more particularly, to FIG. 1 thereof, a vehicle body 10 made of sheet metal is shown mounted on a carrier 12 and being conveyed along a track 14 through a conventional paint booth which, in this case, houses a door-opener apparatus 16 that works in conjunction with a paint robot 18. Both the door-opener apparatus 16 and the paint robot 18 are supported on a horizontal guide rail 20 for movement in either direction along a path that is parallel to the path of travel of the vehicle body 10. The guide rail 20 is mounted on spaced stanchions, two of which are shown in FIG. 1 and identified by the reference numerals 22 and 24. In addition, the guide rail 20 is formed with a rack (not shown) that is engaged by appropriate toothed gearing (not shown) which forms a part of both the door-opener apparatus 16 and the paint robot 18 for causing driving movement of each of these devices along the guide rail 20.

As seen in FIG. 1, the door-opener apparatus 16 is adapted to seize a vertical door rod 28, which is part of a fixture removably mounted to the inner panel of a vehicle door 30, and to cause the door 30 to be moved about its hinged connection to a door-opened position so that the inside of the door 30 can be painted by the paint robot 18 during the painting operation of the vehicle body 10. Thereafter, the door 30 is closed by the door-opener apparatus 16 and the door rod 28 is released, after which the door-opener apparatus 16 returns to a "ready" position, awaiting the arrival of another vehicle body for repeating the door opening and closing operation. It will be noted that both the door-opener apparatus 16 and the paint robot 18 are intended to be program-controlled so that their movements and positions can be coordinated during the painting operation.

Traditionally, one or more single-point sensors or 2-D imaging sensor are used to detect whether hinged parts are open or closed. Such sensors are made by the following companies: Omron, Rockwell Automation, Keyence and Cognex. The sensors may detect "presence" as the interruption of a light beam from emitter to receiver, or infer "presence" by measuring the distance to a point on the nearest object, or confirm that the appearance of the vehicle matches the appearance of a saved 2-D reference image.

These traditional sensors present several problems:

- For a single-point sensor, presence/absence is determined along a single line in 3-D space: a light beam is broken or not, or a distance measurement to a single point falls within the expected depth range or not. This provides very little information. To check multiple hinged parts, or to check a larger volume of space, multiple single-point sensors are required. The more sensors that are added, the more complicated installation and maintenance become.
- For 2-D sensors, presence/absence is inferred by processing images, and in particular by comparing sample images with reference images. The open/closed position of a part can be inferred from the presence and orientation of edges, or the position of holes or part corners. However, setup must typically be customized for each application, and this setup relies on the judgment of a trained engineer. Ambient light, shadows, and other environmental conditions can confuse 2-D image processing algorithms. Using multiple 2-D sensors to yield 3-D data within the region of overlapping fields of view requires more hardware and complicates installation and setup.
- Both single-point sensors and 2-D sensors require significant setup time and training—hours, or possibly days. For single-point sensors in particular, it may be difficult to determine why a sensor triggers unexpectedly since there are no images to interpret. For 2-D sensors, it can be difficult to determine what lighting conditions affect measurement.
- Neither single-point sensors nor 2-D sensors present the hinged part and the vehicle in the context of a 3-D data display. This can make it difficult to visualize where robots, vehicle bodies, and hinged vehicle parts are located relative to one another in 3-D space.

The following U.S. patents are related to at least one aspect of the present invention: U.S. Pat. Nos. 8,364,344; 8,493,496 and 8,803,708.

SUMMARY OF EXAMPLE EMBODIMENTS

An object of at least one embodiment of the invention is to provide a method and system for determining the presence or absence of a part of an assembly within at least one user-defined, 3-D detection region within a work cell.

In carrying out the above object and other objects of at least one embodiment of the present invention, a method of determining the presence or absence of a part of an assembly within at least one user-defined, 3-D detection region within a work cell is provided. The method includes providing a 3-D or depth sensor having a field of view at the work cell. The sensor has a set of radiation sensing elements which detect reflected, projected radiation to obtain 3-D sensor data. The method also includes processing the sensor data from the sensor to obtain a 3-D graphic of the at least one detection region and displaying the 3-D graphic from a viewpoint to determine the presence or absence of the part within the detection region.

The work cell may be a robot work cell.

The assembly may be a vehicle body and the movable part may be a hinged member of the vehicle body.

The hinged member may be one of a door, a hood, a deck lid and a tailgate.

The sensor may include a pattern emitter for projecting a known pattern of radiation and a detector for detecting the known pattern of radiation reflected from a surface of the assembly.

The emitter may emit a non-visible pattern of radiation and the detector may detect the reflected non-visible pattern of radiation.

The sensor may be a volumetric sensor capable of capturing thousands of individual points in space.

The sensor may be a multi-spectral sensor.

The method may further include the step of providing a user interface to allow a user to manipulate the 3-D graphic on a display screen.

The at least one detection region may be defined by 3-D wireframe shapes in the 3-D graphic.

The method may further include receiving a user input command to manipulate the 3-D wireframe shapes on a display screen.

The method may further include receiving a user input command to change the viewpoint of the 3-D graphic on a display screen.

The method may further include receiving a user input command to move the at least one detection region on a display screen.

The method may further include receiving a user input command to resize at least one dimension of the at least one detection region on a display screen.

The sensor may be a hybrid 2-D/3-D sensor.

A plurality of detection regions may be user-defined.

The 3-D graphic may be colored on a display screen to indicate pass or fail conditions.

Further in carrying out the above object and other objects of at least one embodiment of the present invention, a system for determining the presence or absence of a part of an assembly within at least one user-defined, 3-D detection region within a work cell is provided. The system includes a 3-D or depth sensor having a field of view at the work cell. The sensor has a set of radiation sensing elements which detect reflected, projected radiation to obtain 3-D sensor data. The system also includes a processor to process the sensor data from the sensor to obtain a 3-D graphic of the at least one detection region and a display to display the 3-D graphic from a viewpoint to determine the presence or absence of the part within the detection region.

The system may further include a user interface to allow a user to manipulate the 3-D graphic on a screen of the display.

The system may further include a user interface to receive a user input command to manipulate the 3-D wireframe shapes on a screen of the display.

The system may further include a user interface to receiver a user input command to change the viewpoint of the 3-D graphic on a screen of the display.

The system may further include a user interface to receive a user input command to move the at least one detection region on a screen of the display.

The system may further include a user interface to receive a user input command to resize at least one dimension of the at least one detection region on a screen of the display.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In general, at least one embodiment of a method and system of the present invention uses 2-D/3-D hybrid sensors to determine whether parts on an assembly line are present or absent in user-defined regions of 3-D space. This technology solves several problems that arise from attempting to use 1-D single-point sensors or 2-D image sensors for presence/absence applications and represents the first known application of 3-D sensors to automation tasks presently performed by 1-D single-point sensors such as photo-eyes or proximity sensors, or 2-D image sensors such as CCD cameras.

Figure 1:
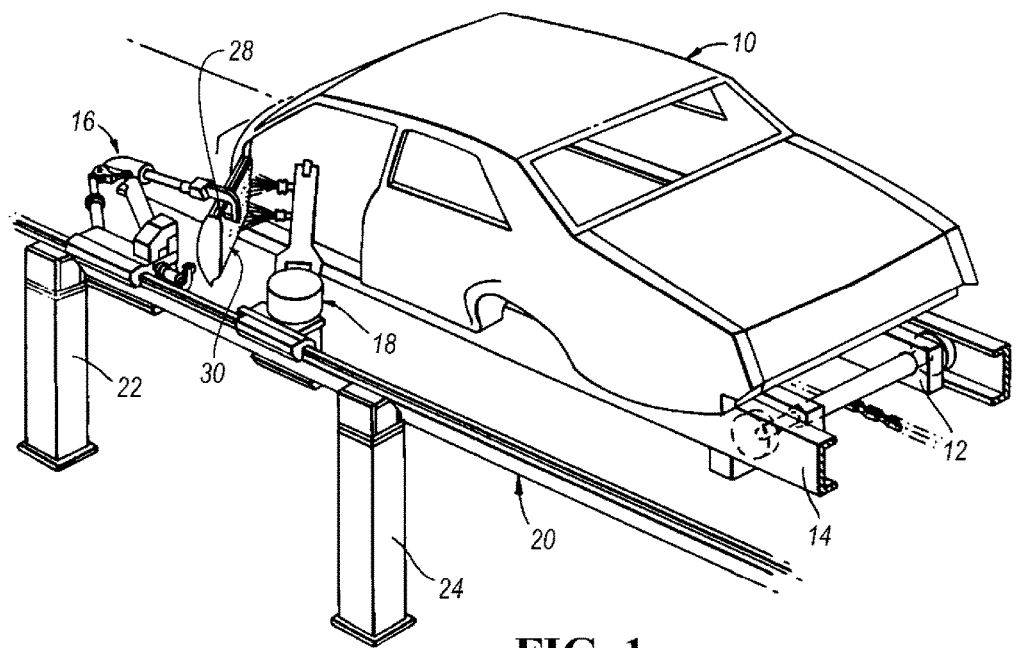
FIG. 1 is a perspective view, partially broken away, showing a vehicle body assembly being conveyed past a prior art system including a door-opener apparatus and a paint robot.
Figure 2:
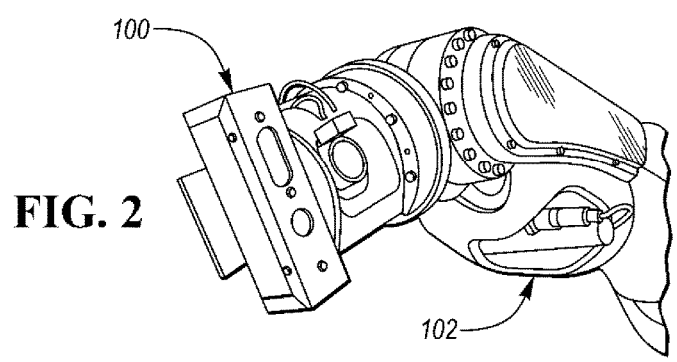
FIG. 2 is a perspective view, partially broken away, of a 3-D or depth sensor mounted on an end effector or hand of a robot.
Figure 3A:
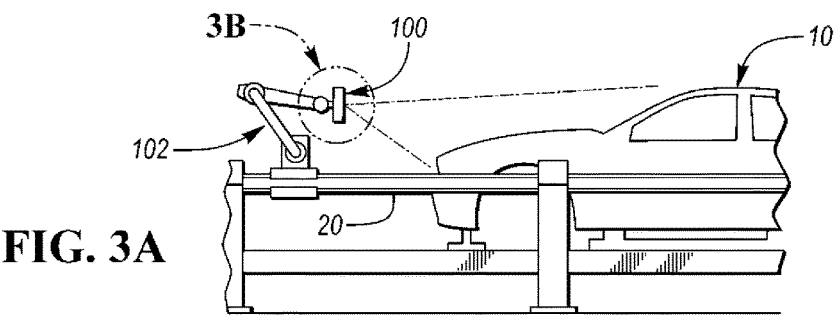
FIG. 3A is a schematic side view of the sensor mounted on the robot of FIG. 2 which, in turn, is mounted on the guide rail of FIG. 1.
Figure 3B:
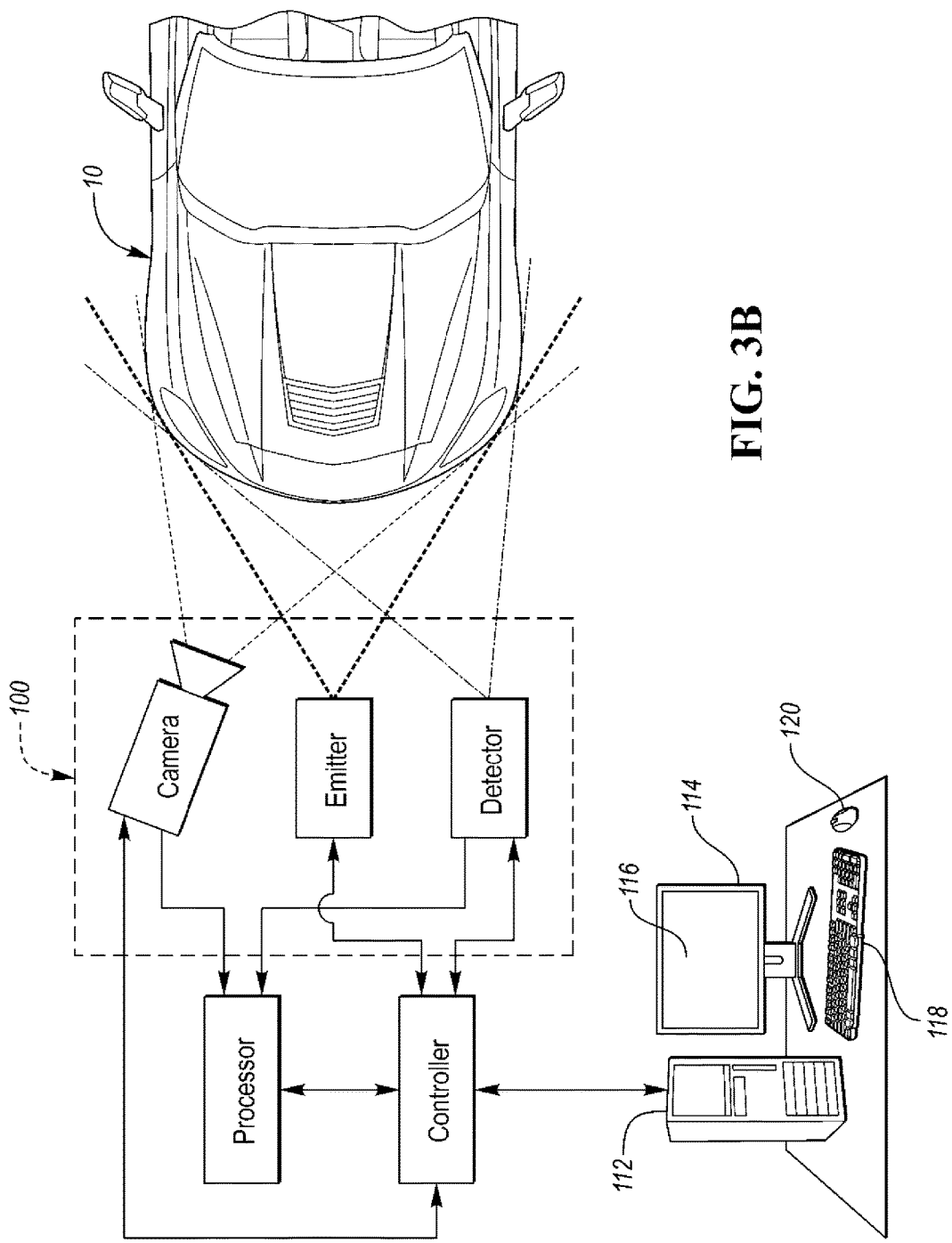
FIG. 3B is a block diagram of a system (without a robot) including the sensor within the circle 3B of FIG. 3A constructed in accordance with at least one embodiment of the present invention with a hood of a vehicle body assembly in its closed position.

The system of at least one embodiment of the present invention includes one or more 3-D or depth sensors such as 2.5 D volumetric or 2-D/3-D hybrid sensors, one of which is generally indicated at 100 in FIGS. 2, 3A and 3B. FIG. 2 shows the sensor 100 mounted on the distal end of a robot arm 102. FIG. 3 shows the sensor 100 mounted on the robot 102 in the environment of FIG. 1.

The sensor technology described herein is sometimes called "3-D" because it measures X, Y and Z coordinates of objects within a scene. This can be misleading terminology. Within a given volume these sensors only obtain the X, Y and Z coordinates of the surfaces of objects; the sensors are not able to penetrate objects in order to obtain true 3-D cross-sections, such as might be obtained by a CAT scan of the human body. For this reason, the sensors are often referred to as 2½-D sensors which create 2½ dimensional surface maps to distinguish them from true 3-D sensors which create 3-D tomographic representations of not just the surface, but also the interior of an object.

In spite of this distinction between 2.5-D and 3-D sensors, people in the vision industry will often speak of 2.5-D sensors as 3-D sensors. The fact that "3-D Vision" sensors create 2.5-D surface maps instead of 3-D tomographs is implicit.

Referring to FIG. 3B, preferably these sensors each comprise a near-infrared pattern projector or emitter, a near-infrared camera or detector and a visible light monochromatic or color camera. The near infrared pattern is projected by the emitter onto the surface of the vehicle and is read by the detector along with the information from the visible light camera. In other words, the laser projector operates in the near infrared by means of diffractive optical elements to project several tens of thousands of laser pencils or beams onto a scene to be analyzed. The infrared camera analyzes the infrared scene to locate the intersections of the laser pencils with the scene and then uses geometry to calculate the distance to objects in the scene. The visible light camera in a preferred embodiment is used to associate a color or monochrome intensity to each portion of the analyzed image.

The IR pattern emitter may comprise of an infrared laser diode emitting at 830 nm and a series of diffractive optics elements. These components work together to create a laser "dot" pattern. The laser beam from the laser diode is shaped in order to give it an even circular profile then passed through two diffractive optics elements. The first element creates a dot pattern containing dots, the second element multiplies this dot pattern into a grid. When the infrared pattern is projected on a surface, the infrared light scattered from the surface is configured to be sensitive in the neighborhood of 830 nm.

In addition to the IR sensor, there may be an RGB sensor or camera configured to be sensitive in the visible range, with a visible light band-pass filter operative to reject light in the neighborhood of 830 nm. During operation, the IR sensor is used to calculate the depth of an object and the RGB sensor is used to sense the object's color and brightness. This provides the ability to interpret an image in what is traditionally referred to as two and a half dimensions. It is not true 3-D due to the sensor only being able to detect surfaces that are physically visible to it (i.e., it is unable to see through objects or to see surfaces on the far side of an object).

Alternatively, the 3-D or depth sensor 100 may comprise light-field, laser scan, time-of-flight or passive binocular sensors, as well as active monocular and active binocular sensors.

Preferably, the 3-D or depth sensors 100 of at least one embodiment of the invention measure distance via massively parallel triangulation using a projected pattern (a "multi-point disparity" method). The specific types of active depth sensors which are preferred are called multipoint disparity depth sensors.

"Multipoint" refers to the laser projector which projects thousands of individual beams (aka pencils) onto a scene. Each beam intersects the scene at a point.

"Disparity" refers to the method used to calculate the distance from the sensor to objects in the scene. Specifically, "disparity" refers to the way a laser beam's intersection with a scene shifts when the laser beam projector's distance from the scene changes.

"Depth" refers to the fact that these sensors are able to calculate the X, Y and Z coordinates of the intersection of each laser beam from the laser beam projector with a scene.

"Passive Depth Sensors" determine the distance to objects in a scene without affecting the scene in any way; they are pure receivers.

"Active Depth Sensors" determine the distance to objects in a scene by projecting energy onto the scene and then analyzing the interactions of the projected energy with the scene. Some active sensors project a structured light pattern onto the scene and analyze how long the light pulses take to return, and so on. Active depth sensors are both emitters and receivers.

For clarity, the sensor 100 is preferably based on active monocular, multipoint disparity technology as a "multipoint disparity" sensor herein. This terminology, though serviceable is not standard. A preferred monocular (i.e., a single infrared camera) multipoint disparity sensor is disclosed in U.S. Pat. No. 8,493,496. A binocular multipoint disparity sensor, which uses two infrared cameras to determine depth information from a scene, is also preferred.

Multiple volumetric sensors are placed in key locations around and above the vehicle. Each of these sensors typically captures hundreds of thousands of individual points in space. Each of these points has both a Cartesian position in space and an associated RGB color value. Before measurement, each of these sensors is registered into a common coordinate system. This gives the present system the ability to correlate a location on the image of a sensor with a real world position. When an image is captured from each sensor, the pixel information, along with the depth information, is converted by a computer 112 into a collection of points in space, called a "point cloud".

A point cloud is a collection of data representing a scene as viewed through a "vision" sensor. In three dimensions, each datum in this collection might, for example, consist of the datum's X, Y and Z coordinates along with the Red, Green and Blue values for the color viewed by the sensor 100 at those coordinates. In this case, each datum in the collection would be described by six numbers. To take another example: in two dimensions, each datum in the collection might consist of the datum's X and Y coordinates along with the monotone intensity measured by the sensor 100 at those coordinates. In this case, each datum in the collection would be described by three numbers.

The computer 112 of FIG. 3B controls a controller which, in turn, controls a processor, the camera, the emitter and the detector of the sensor 100.

At least one embodiment of the present invention uses hybrid 2-D/3-D sensors 100 to measure color, brightness and depth at each of hundreds of thousands of pixels per sensor 100. The collective 3-D "point cloud" data is presented on a screen 116 of a display 114 as a rotatable, zoomable 3-D graphic.

The field of view of each 2-D/3-D sensor 100 can be as wide as several meters across, making it possible for the user to see a hinged part such as a door or hood relative to the vehicle body 10 in 3-D. The graphic on the screen 110 (i.e. FIGS. 4A, 4B and 4C) looks like the 3-D part the user sees in the real world. Users can even walk into the field of the view of the 2-D/3-D sensor 100 and see themselves in 3-D as they move into and out of detection regions.

Figure 4A:
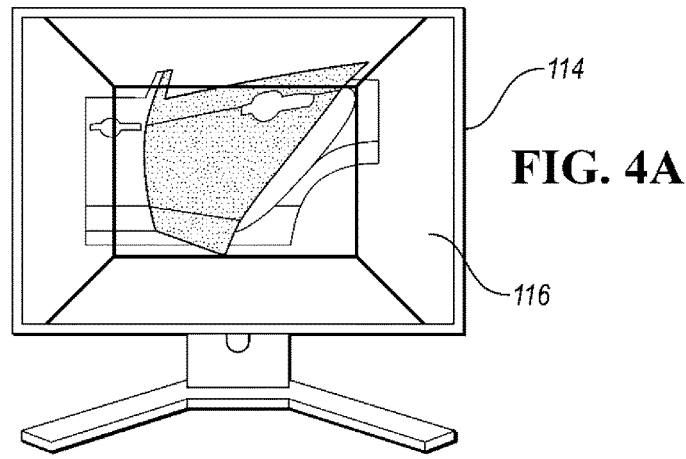
FIG. 4A is a 3-D graphic displayed on a screen of a display of FIG. 3B and showing a front view of a detection region having a door (sensor view point)
Figure 4B:
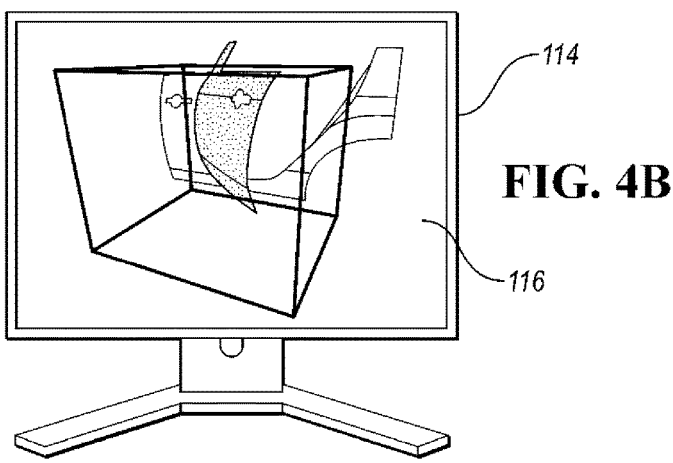
FIG. 4B is similar to FIG. 4A but showing an angled view.
Figure 4C:
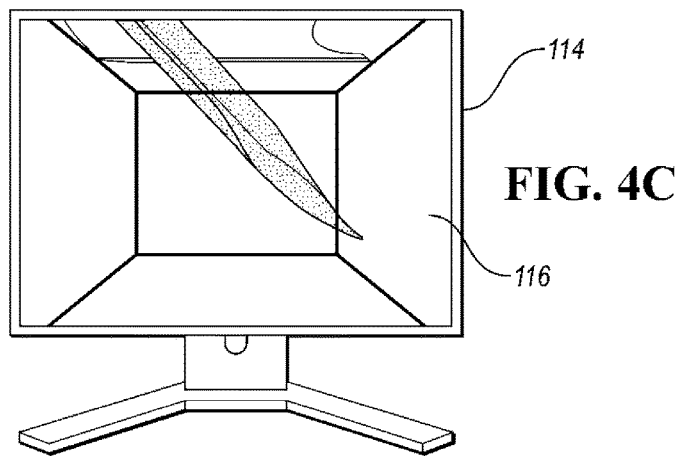
FIG. 4C is similar to FIGS. 4A and 4B but showing a top view.

As shown in FIGS. 4A-4C, detection regions in 3-D space are defined as cubes and/or other wireframe shapes in the 3-D graphic. The user can manipulate the 3-D wireframes to set the regions where parts must be present or absent. The user can change the viewpoint of the 3-D graphic to see the detection regions from the front, from the top, or from whatever viewpoint is preferred via a graphical user interface which is capable of receiving user input commands such as via a keyboard 118 or a mouse 120.

The 3-D graphics is colored green or red to indicate pass or fail conditions. There's no need to explain what the system is doing—the user can see what's happening in 3-D on the screen 116 in real time.

Multiple independent detection regions can be defined for each sensor. One PC 112 can handle input from multiple sensors 100, allowing for dozens of detection regions in a volume of space the size of a vehicle.

Detection regions can be moved by using the mouse 120 to click buttons to move the detection region up, down, front, back, left or right. Detection regions can be resized by clicking buttons to increase or decrease the length, width or height.

The following are a list of problems solved by at least one embodiment of the present invention, and additional benefits:

3-D detection regions of arbitrary shape and size
- a cuboid (rectangular prism) can be used as the detection region for most applications;
- other polyhedra such as spheres, pyramids, etc., can be used alone or in combination to create 3-D detection regions of arbitrary complexity;
- detection regions can range in size from centimeters to meters across the length, width or height;
- wedges or triangular prisms may be used for the detection of hinged parts in each of multiple indexed positions.

Data is captured, displayed, and saved in 3-D.
- hinged parts and their surroundings can be viewed from any arbitrary viewpoint;
- setup and production 3-D data can be saved to file. The data can then be reloaded at any time later, and viewed from any desirable viewpoint.

There is no need for part training. The system doesn't "recognize" a part. Instead, it allows users to define the regions of space that should either include objects (presence detection) or exclude objects (absence detection).
- in one embodiment of the invention, the system can learn the difference between OK and NOT OK configurations by simply being shown good configurations and bad configurations along with an indication of which is which.

Multiple, independent detection regions can be set up.
- no change in mechanical fixturing is required to add detection regions or change parameters. The user simply selects the number of detection regions on the screen 116.
- presence/absence selection is simply an on-screen option. By contrast, single-point sensors may be limited to either "normally open" or "normally closed" detection.
- all actions to move, size, and rotate detection regions can be made using just the computer mouse 120.

Real-time algorithms assist with system setup.
- the user can select the Auto-Exclusion option and click on the part surface to automatically move the detection region in front of a closed hinged part. When the part opens, it will intrude into the automatically placed exclusion zone.
- the user can select the Auto-Inclusion option and click on the part surface to automatically center a detection region on the part. The automatically placed inclusion zone will detect the part's absence.

Simple, intuitive feedback.
- if an object moves into a region where there should be no part, the object is colored red and the system indicates a presence/absence failure.
- if a part is present within the detection region as expected, the part is colored green and the system indicates a presence/absence pass.
- if an object blocks the sensor's view, the object is colored light blue and the system reports an interference problem. Coloring the interfering object blue makes it easy to identify.

Insensitivity to ambient lighting conditions.
- To measure distance at each pixel, the 2-D/3-D hybrid sensor 100 emits its own near-infrared light that is invisible to the naked eye. No ambient light is required to determine the present/absence of a hinged part—the system can operate in a "lights out" environment.
- Changing ambient lighting conditions may affect the color of the 3-D display 114, but does not affect the presence/absence measurement.

For suitable applications, the system can be configured to add functionality:
- convert sensor XYZ coordinates to real world XYZ coordinates so that data from multiple 2-D/3-D sensors 100 can be combined into the united, single 3-D display 114.
- the sensor 100 can measure a fiducial object at a known distance to continuously calibrate sensor depth measurement and thereby maintain high accuracy.
- detection regions can be derived from robot work envelopes.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of determining the presence or absence of a part of an assembly within at least one user-defined, 3-D detection region within a work cell or station, the method comprising:
   - providing a 3-D or depth sensor having a field of view at the work cell or station, the sensor having a set of radiation sensing elements which detect reflected, projected radiation to obtain 3-D sensor data;
   - processing the sensor data from the sensor to obtain a 3-D graphic of the at least one detection region;
   - displaying the 3-D graphic from a viewpoint to determine the presence or absence of the part within the detection region; and
   - receiving a user input command to either manipulate 3-D wireframe shapes, change the viewpoint of the 3-D graphic, move the at least one detection region or resize at least one dimension of the at least one detection region on a display screen.

2. The method as claimed in claim 1, wherein the work cell is a robot work cell.

3. The method as claimed in claim 1, wherein the assembly is a vehicle body and the part is a hinged member of the vehicle body.

4. The method as claimed in claim 3, wherein the hinged member is one of a door, a hood, a deck lid and a tailgate.

5. The method as claimed in claim 1, wherein the sensor includes a pattern emitter for projecting a known pattern of radiation and a detector for detecting the known pattern of radiation reflected from a surface of the assembly.

6. The method as claimed in claim 5, wherein the emitter emits a non-visible pattern of radiation and the detector detects the reflected non-visible pattern of radiation.

7. The method as claimed in claim 1, wherein the sensor is a volumetric sensor capable of capturing thousands of individual points in space.

8. The method as claimed in claim 1, wherein the sensor is a multi-spectral sensor.

9. The method as claimed in claim 1, further comprising the step of providing a user interface to allow a user to manipulate the 3-D graphic on a display screen.

10. The method as claimed in claim 1, wherein the at least one detection region is defined by the 3-D wireframe shapes in the 3-D graphic.

11. The method as claimed in claim 1, wherein the sensor is a hybrid 2-D/3-D sensor.

12. The method as claimed in claim 1, wherein a plurality of detection regions are user-defined.

13. The method as claimed in claim 1, wherein the 3-D graphic is colored on a display screen to indicate pass or fail conditions.

14. A system for determining the presence or absence of a part of an assembly within at least one user-defined, 3-D detection region within a work cell or station, the system comprising:
   a 3-D or depth sensor having a field of view at the work cell, the sensor having a set of radiation sensing elements which detect reflected, projected radiation to obtain 3-D sensor data;
   a processor to process the sensor data from the sensor to obtain a 3-D graphic of the at least one detection region;
   a display to display the 3-D graphic from a viewpoint to determine the presence or absence of the part within the detection region; and
   a user interface to receive a user input command to either manipulate 3-D wireframe shapes, change the viewpoint of the 3-D graphics, move the at least one detection region or resize at least one dimension of the at least one detection region on a screen of the display.

15. The system as claimed in claim 14, wherein the work cell is a robot work cell.

16. The system as claimed in claim 14, wherein the assembly is a vehicle body and the part is a hinged member of the vehicle body.

17. The system as claimed in claim 16, wherein the hinged member is one of a door, a hood, a deck lid and a tailgate.

18. The system as claimed in claim 14, wherein the sensor includes a pattern emitter for projecting a known pattern of radiation and a detector for detecting the known pattern of radiation reflected from a surface of the assembly.

19. The system as claimed in claim 18, wherein the emitter emits a non-visible pattern of radiation and the detector detects the reflected non-visible pattern of radiation.

20. The system as claimed in claim 14, wherein the sensor is a volumetric sensor capable of capturing thousands of individual points in space.

21. The system as claimed in claim 14, wherein the sensor is a multi-spectral sensor.

22. The system as claimed in claim 14, further comprising a user interface to allow a user to manipulate the 3-D graphic on a screen of the display.

23. The system as claimed in claim 14, wherein the at least one detection region is defined by the 3-D wireframe shapes in the 3-D graphic.

24. The system as claimed in claim 14, wherein the sensor is a hybrid 2-D/3-D sensor.

25. The system as claimed in claim 14, wherein a plurality of detection regions are user-defined.

26. The system as claimed in claim 14, wherein the 3-D graphic is colored on a screen of the display to indicate pass or fail conditions.

* * * * *